United States Patent [19]

Hardwick

[11] 4,205,422

[45] Jun. 3, 1980

[54] TUBE REPAIRS

[75] Inventor: Roy Hardwick, Leeds, England

[73] Assignee: Yorkshire Imperial Metals Limited, Leeds, England

[21] Appl. No.: 913,463

[22] Filed: Jun. 7, 1978

[30] Foreign Application Priority Data

Jun. 15, 1977 [GB] United Kingdom ............... 25006/77

[51] Int. Cl.$^2$ ............................................. B23P 15/26
[52] U.S. Cl. ........................... 29/402.13; 29/157.3 C;
  29/402.19; 29/421 E; 228/107
[58] Field of Search ................................. 228/107–109;
  29/421 E, 401 R, 401 E, 401 C, 157.3 R, 157.3 C

[56] References Cited

U.S. PATENT DOCUMENTS

| | | | |
|---|---|---|---|
| 3,409,969 | 11/1968 | Simons et al. ................ | 29/421 E X |
| 3,503,110 | 3/1970 | Berry et al. ...................... | 29/421 E |
| 3,535,767 | 10/1970 | Doherty, Jr. et al. ........ | 29/421 E X |
| 3,562,887 | 2/1971 | Schroeder et al. ............. | 228/107 X |
| 3,672,035 | 6/1972 | Lieberman ...................... | 29/421 E X |
| 3,698,067 | 10/1972 | Feiss .................................. | 228/107 |
| 3,781,966 | 1/1974 | Lieberman ......................... | 29/421 E |
| 3,807,024 | 4/1974 | Harvey et al. .................... | 29/401 R |
| 3,962,767 | 6/1976 | Berley et al. .................... | 29/157.3 R |
| 4,028,789 | 6/1977 | Loch .................................. | 29/421 E |

FOREIGN PATENT DOCUMENTS 1125809  9/1968  United Kingdom .

*Primary Examiner*—Leon Gilden
*Attorney, Agent, or Firm*—Cushman, Darby & Cushman

[57] ABSTRACT

A method of repairing a joint between a tube and a tube plate comprising removing an end portion of the tube and replacing it with a connector explosively welded to the tube and the plate.

6 Claims, 2 Drawing Figures

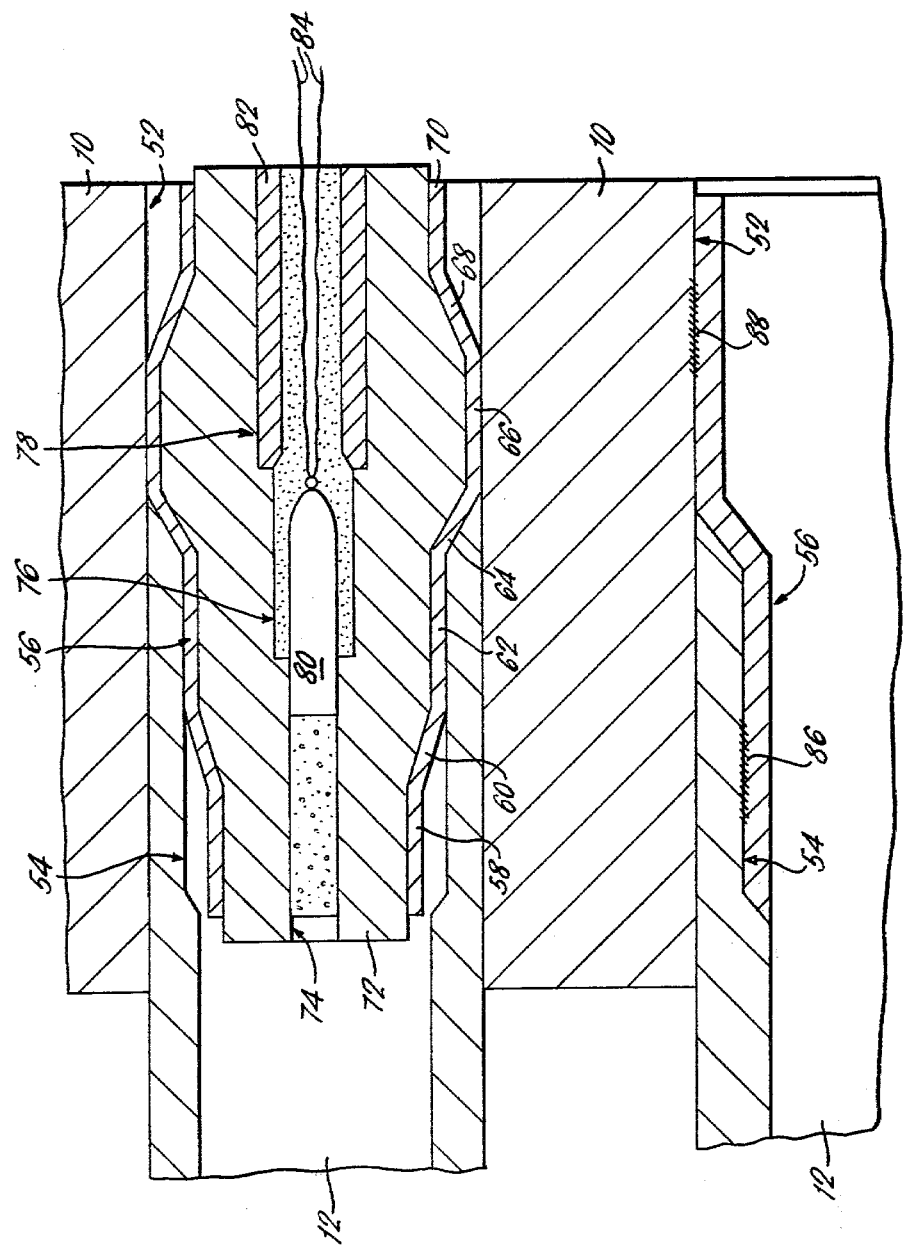

TUBE REPAIRS

The present invention relates to a method and a device for repairing a joint, particularly but not exclusively a joint between a heat exchanger tube and a tube plate.

Prior Art

In the last decade, explosive metal working techniques have been found particularly useful in the production of joints between tubes and bodies such as tube plates and tube flanges. The joints may be mechanical joints, e.g. made by explosive expansion of a tube to engage a tube plate mechanically and thereby connect the tube to the plate. The joints may alternatively be welded; that is the explosive expansion may be so controlled as to produce a metallurgical bond between the material of the tube and the material of the plate or other body. Examples of the former technique are shown in U.S. Pat. Nos. 3411198, 3426681, 3543370, 3562887, and 3939681, and examples of the latter are shown in U.S. Pat. Nos. 3140537, 3364562, 3364561, 3402870, 3409969, 3446047, 3503110, 3562897, 3672035, 3698067, 3717925, 3774291, 3868131 and 4003513.

More recently, explosively formed joints have been used to plug leaking/damaged tubes for example as shown in U.S. Pat. Nos. 3491798, 3543387, 3555656, 3590877, 3724062, 3785291, 3919940 and 4021907. Obviously plugging of a heat exchanger tube detracts, however slightly, from the performance of the exchanger, and if an excessive number of tubes is plugged off then the exchanger no longer performs its designed function.

Explosive tube repair techniques involving expansion of sleeves within tube ends have also been suggested, for example in U.S. Pat. Nos. 3781966 and 4028789 and in our own prior U.S. Patent Application Ser. No. 816913 (U.K. Pat. No. 30140/76). The difficulty with such repair techniques is that they are designed mainly to deal with damage arising from the interior of the tube. Expansion of the tube end as the repair sleeve is expanded within it may cure a leak between the tube and plate. However, this may require a substantial charge to effect the expansion and the resultant shock on adjacent tube joints may create further leak paths particularly where the original joints were made by simple expansion techniques (e.g. roller expansion) or by a technique producing a brittle weld (e.g. some fusion welding techniques).

It has not previously been appreciated that high energy rate techniques such as explosive techniques, permit the removal of the end of the tube originally jointed to the other body, and the replacement of the removed part by a connector jointed to both the tube and the body. This enables virtual re-establishment of the original flow path. It is of course possible to use a connector to bridge the original joint without removing the old tube end, but this will usually interfere with the flow path.

It has of course been known for many years that articles can be explosively joined by joining each to a connector sleeve. Such a technique was described in U.S. Pat. No. 2367206. However, this technique has not previously been applied to the repair of an existing joint, especially where that joint is between a tube and a tube end piece, that is a body extending transversely of the tube and having an opening which receives the end of the tube or which is aligned with the end of the tube so that a flow path including the tube bore extends through said opening. The most common tube endpieces are tube-plates, tube headers and tube flanges, but the invention is not limited to these particular endpieces.

DESCRIPTION OF THE INVENTION

The invention therefore relates to a method of repairing a joint between a tube and another body comprising making a first joint between a tubular connector and the tube and a second joint between the connector and the other body.

At least one joint, and preferably both, may be made by a high energy rate technique, preferably explosive. At least one joint, and preferably both, may comprise a weld. At least one joint, and preferably both, may be made by expansion of the connector. Preferably, part of the tube is removed to receive the connector. Thus the latter may substantially re-establish an original surface of the tube, usually its bore, although the re-established surface could be on the exterior of the tube in some circumstances.

The tube may be associated with an opening in said other body, and in particular it may extend into that opening. If the tube extends completely through a bore in the other body, a portion of the tube may be removed to expose a surface on the other body to enable formation of the second joint with the exposed surface. Where the tube does not extend into the opening, a support may be provided on a surface of the tube opposite to that surface which forms the first joint to support the tube during formation of the joint with the connector. In any event, the connector preferably extends into said opening. In the preferred embodiment, both joints are made within said opening in said other body. The latter may be an endpiece as defined above.

Preferably the two joints are made substantially simultaneously. Where the joints are made by explosives, simultaneous formation of the joints is facilitated by use of two detonation fronts travelling in opposite directions from a common initiating means. However, precisely simultaneous formation of the joints is not essential, and they could be formed successively by a single detonation front travelling through an elongated charge.

The initiating means for the explosive may be a detonator, and the detonator may provide a charge for forming one of the said joints. An additional charge portion may be provided to form the other joint, being associated with the detonator so as to be initiated by it in use.

Preferably the connector and at least one of said bodies are so arranged that the joint is formed in accordance with our prior U.S. Pat. No. 3,503,110, the disclosure of which is hereby incorporated in the present specification by reference. That specification describes a joint between a tube and a tube plate, but it will be apparent that the techniques disclosed therein can be applied to formation of a joint between a tube and a body other than a tube plate.

The invention also provides a connector for use in a method as described above and having a first portion which, when located within a generally cylindrical surface defining a bore, will have a tapered annular space between itself and said surface, and a second portion which is arranged either so that (a) when located in a generally cylindrical surface defining a bore, an annular tapered space will be produced between itself and said surface, or (b) when located in a tapered tubular surface defining a bore, there will be an annular tapered space between itself and said surface, each said portion being deformable by a high energy rate technique to form a joint with said surfaces. The high energy rate technique may involve an explosive, electro-hydraulic or electro-magnetic forming technique.

The arrangement is preferably such that the tapered spaces produced around said portions will diverge in opposite directions. The connector may comprise a cylindrical portion to engage the interior of the tube and at least two frusto-conical portions providing the first and second portions respectively. The connector preferably has two cylindrical portions separated by a transition part which may also be frusto-conical. Preferably the frusto-conical portions which provide the first and second portions respectively each lead into a cylindrical portion at a respective end of the connector.

Preferably the connector has a tubular insert of solid energy transmitting material, preferably polythene. The external surface of the insert may engage the internal surface of the connector, or an air gap may be provided between the insert and the connector over at least a portion of their facing surfaces. At least a portion of the internal surface of the insert may be suitably profiled to receive a desired charge of plastic explosive. The insert may comprise a plurality of members, one of which may be located relative to the other after a charge of plastic explosive has been introduced into the first member.

BRIEF DESCRIPTION OF THE DRAWINGS

By way of example two embodiments of the invention will now be described with reference to the accompanying diagrammatic drawings in which:

FIG. 2 is a similar section illustrating a second repair technique in accordance with the invention.

DESCRIPTION OF THE PREFERRED EMBODIMENT(S)

Figure 1:
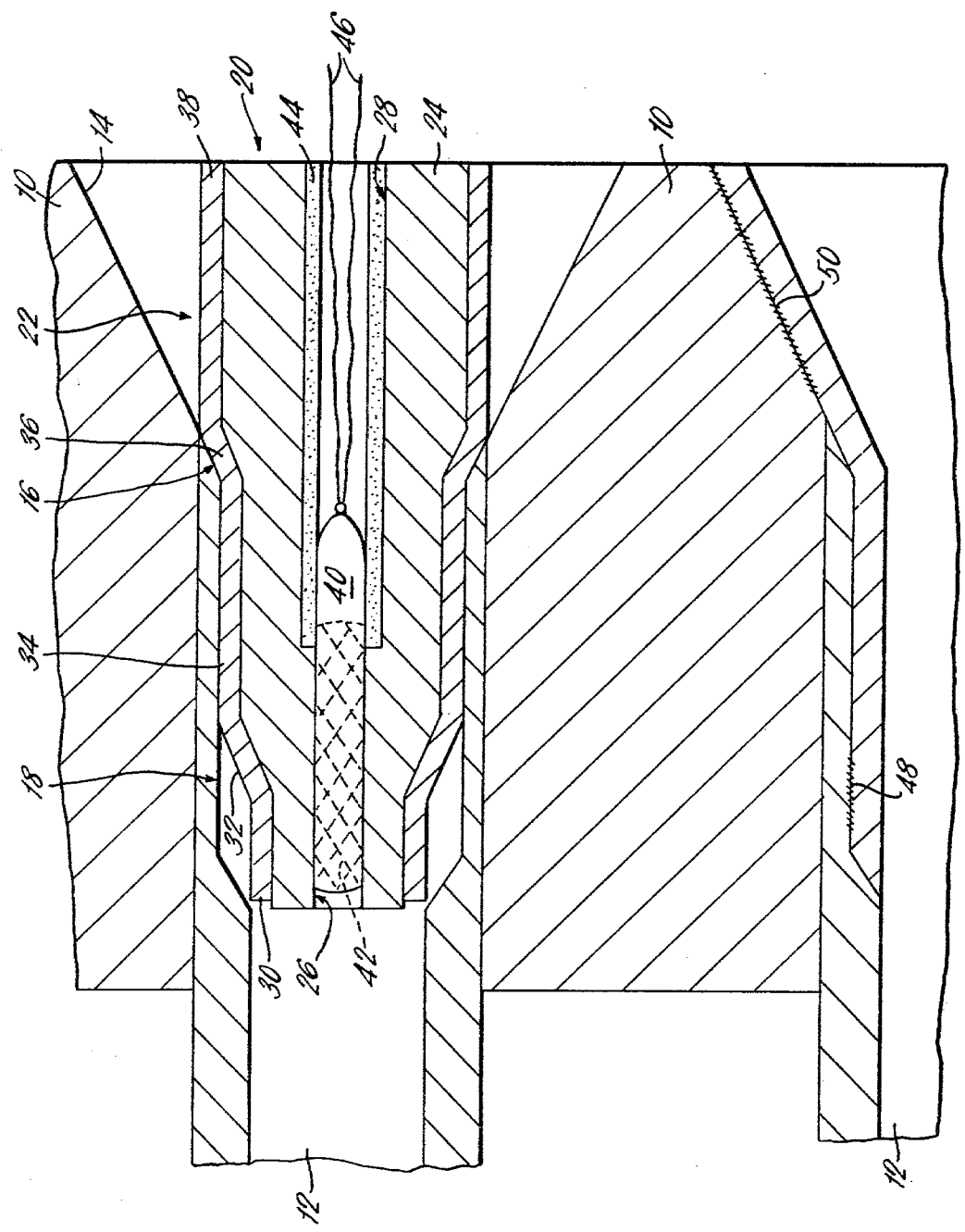
FIG. 1 is a section through a tube to tube plate joint and a part of an adjacent joint illustrating a first repair technique in accordance with the invention.

In both drawings the reference numeral 10 indicates a tube plate in which tubes 12 have been secured in respective openings. In FIG. 1, it is assumed that the joint between the tube and the tube plate was made by a technique in accordance with our prior U.S. Pat. No. 3,503,110. Thus, each tube plate opening has a tapered portion at the front face of the tube plate, and each tube 12 originally extended through its opening to that front face. Assume now that a leak occurs in the weld at the tapered portion 14.

The first stage in the illustrated repair technique is to remove the original portion of the tube welded to the tube plate on the taper 14, thereby exposing the tube plate surface on the taper. This can be done by a suitable machining technique, in the course of which the taper on the tube plate is continued across the end of the remaining tube portion as indicated at 16. The second step is to enlarge the bore of the tube 12 within the tube plate 10, as illustrated at 18.

The device 20 shown in FIG. 1 is now located in the position shown in that figure. The device comprises a connector 22, preferably of a ductile metal, for example nickel. Connector 22 contains an insert 24 of solid energy transmitting material, preferably plastics such as polyethylene. The insert has a bore comprising two portions 26, 28, the bore portion 28 being of larger diameter.

Connector 22 comprises five integral portions as follows, starting from the left-hand end of the connector as shown in FIG. 1:

(a) a cylindrical portion 30,
(b) a frusto-conical portion 32,
(c) a cylindrical portion 34,
(d) a frusto-conical portion 36,
(e) a cylindrical portion 38.

A detonator 40 is located within the insert 24 so that most of the elongate base charge 42 contained within the detonator case lies in the bore portion 26 of the insert, but a small length of the base charge projects into the bore portion 28 of the insert. The full length of the bore portion 28 is lined with a sleeve of a suitable explosive 44. In use, the detonator is initiated via leads 46, producing a detonation front travelling from right to left through the base charge 42 as viewed in FIG. 1. The shock front produced by the explosive is transmitted through the insert 24 to expand the connector portions 32 and 30 into engagement with the drilled out portion 18 of the tube 12. The amount of material removed from the tube 12 in the drilling operation is such that the original bore of the tube is substantially re-established by the expanded surface of the connector 22, as can be seen from the completed repair shown in the lower half of FIG. 1. Further, the choice of explosive for the detonator and the initial angle between the frusto-conical portion 32 and the tube portion 18 is such that a weld is formed between the frusto-conical portion 32 of the connector and the tube portion 18, as described in our prior U.S. Pat. No. 3,503,110. The location of this weld is indicated by the wavy interface shown at 48 in the lower portion of FIG. 1.

Because of projection the charge 42 into the cylindrical charge 44, the latter is initiated simultaneously, producing an annular detonation front travelling from left to right through charge 44. The cylindrical portion 34 of the connector is therefore firmly expanded into contact with the tube portion 18, and the frusto-conical portion 36 of the connector is expanded into contact with the tapered end surface of the tube. The tapered surface on the tube provides a transition between the cylindrical surface of the tube 18 and the tapered bore 14 avoiding undue stress in the connector material in the transition region. The cylindrical portion 38 of the connector is progressively expanded into contact with the tapered bore 14 on the tube plate, forming a weld indicated by the wavy interface 50 in the lower half of FIG. 1. The choice of explosives and of angles required to produce such a weld is fully disclosed in our prior U.S. Pat. No. 3,503,110.

Thus, it will be seen from the lower part of FIG. 1 that the end portion of the tube 12 has been substantially reconstituted and rewelded to the tube plate 10 to provide a leak-tight joint, without substantial restriction in the bore of the tube 12 but with a thinner tube end.

The arrangement shown in FIG. 2 is also designed to reconstitute the end of a tube and weld it to a tube plate in a leak-tight fashion. In this case, however, there is no tapered bore in the tube plate. The original joint could be made for instance by mechanical or explosive expansion to form a mechanical joint or by fusion welding at the front face of the tube plate or by explosive welding using a parallel geometry technique, for example as described in U.S. Pat. No. 3,409,969. The end portion of tube 12 is again removed to expose a surface of the tube plate within the bore, and the bore of the remaining tube end is again enlarged. The exposed surface of the tube plate is indicated by the numeral 52, and the drilled out portion of the tube is indicated by the numeral 54 in FIG. 2. In this case, a more complex connector 56, having the following portions is required:

(a) a cylindrical portion 58,
(b) a frusto-conical portion 60,
(c) a cylindrical portion 62,
(d) a frusto-conical portion 64,
(e) a cylindrical portion 66,
(f) a frusto-conical portion 68, and
(g) a cylindrical portion 70.

The portions 58, 60, 62 and 64 correspond with the portions 30, 32, 34 and 36 in FIG. 1 and function in the same manner. The portion 66 is arranged to engage the surface of the tube plate within the bore, and the portion 68 is to be welded to the tube plate as will be described below.

The connector 56 contains a tubular insert portion 72 of a material similar to that described above for the insert 24. The insert portion 72 has a bore comprising three sections, 74, 76 and 78 considered from the left-hand end as shown in FIG. 2. Bore 74 is dimensioned to receive a predetermined weight per unit length of a given plastic explosive, for example that sold by ICI under the name "Metabel". A column of such explosive is formed in the bore 76, leaving the right hand end of the bore free to receive one end of a detonator 80, the rest of which projects from the bore 74 into the left-hand end of the bore 76. The remainder of the bore 76 is filled with plastic explosive. When the bore 76 has been filled, a sleeve 82 of similar material to the insert portion 72 is located in the bore 78 and reduces the internal diameter of that bore to a predetermined value. The remaining bore is then also filled with a plastic explosive, the quantity of explosive therefore being determined by the bore of the sleeve 82.

Initiating wires 84 for the detonator extend through the sleeve 82. When the detonator is initiated via those wires, a detonation front travels from the detonator leftwards along the bore 74, causing expansion of the connector portions 60 and 58 and welding of portion 60 to the drilled out tube 54; the resulting weld is shown in the wavy interface 86 in the lower part of FIG. 2.

The detonator also initiates the plastic explosive within the bore 76, causing a detonation front to travel rightwards along the explosive column, as viewed in FIG. 2. This expands the connector portions 64 and 66 into engagement with the tube end and tube plate surfaces respectively, and causes progressive expansion of the connector portion 68 against the tube plate to form a weld as indicated by the wavy interface 88 in the lower half of FIG. 2. In both of the connectors shown in FIG. 1 and FIG. 2, the cylindrical end portions 30, 58 and 70 avoid premature dissipation of the expansion effect due to the explosive, ensuring a weld over the full length of each tapered connector portion 32, 60 and 68.

The invention is not limited to details of the illustrated embodiments. In FIGS. 1 and 2, both the weld with the tube plate and the weld with the tube have been made within the tube plate bore, and this is preferred because the tube plate itself supports the tube during formation of a weld between the tube and the connector. However, if a suitable support can be arranged around the tube, a weld between the tube and the connector can be made outside the tube plate bore. This latter arrangement will be particularly useful where the tube was joined to the tube plate by a weld at the back face of the plate, so that it did not extend into the tube plate at all or to any significant extent.

In the illustrated embodiment, it has been assumed that welds are to be produced by the techniques described in our prior U.S. Pat. No. 3,503,110. However, this is not essential. Alternative explosive welding techniques, for example using parallel geometry, are known and examples thereof have been cited in the introduction to this specification. Further, it may not be essential to form a welded joint at all, since a mechanical expansion joint may prove sufficient. For example one form of expansion joint is shown in our prior British Patent Application 18446/75.

Further, it has been assumed desirable to make both joints, that is the joint with the tube and the joint with the tube plate substantially simultaneously. However, the joints could be made successively, in a single operation but requiring only a single detonation front travelling in one direction through a column of explosive. In a further alternative, the two joints could be made in separate operations. However, this latter possibility is relatively cumbersome.

It will be appreciated that the invention enables tubes to be kept in service even though the joint with the tube plate has deteriorated. Normally such tubes must be plugged off, for example as described in our prior British Pat. No. 1 439 141. Also, if an end portion of the tube has deteriorated, for example has been eroded as described in U.S. Pat. No. 3,781,966, the invention enables tube end replacement. Further, if the end portion of the tube has developed a leak separate from the joint between the tube and the plate, this leak can also be repaired by means of a replacement tube portion as described above with the replacement tube portion either covering up the leaking tube portion or replacing it. The expression "repairing a joint" is therefore to be interpreted broadly, and is not limited to repair of a leak in the joint itself. In this invention, however, the connector piece is connected to two bodies, even though leakage may appear in only one of them.

Where an end portion of the tube is severely eroded, it may not be possible to remove all of the erosion marks by drilling out as described above. If remaining erosion marks are so deep as to endanger the connector upon explosive expansion, the or each remaining mark may be filled before insertion of the connector. The filler material should prevent penetration of the connector into the erosion mark at least so as to avoid significant damage to the connector. Similar remarks apply where a crack has appeared right through the wall of the tube causing it to leak in the joint region; such a leak can be repaired by replacing the end portion of the tube by a technique as described above, with the connector extending sufficiently far down the tube to close off the leak. The crack may have to be filled, however, as described above.

In the description of the drawings, we have referred to re-establishment of the original tube bore. This is desirable, but it is clearly not essential. Even in the illustrated embodiments, we have not attempted to re-establish the original tube bore at the front face of the tube plate, where the connector is welded to the plate. The original tube bore could be re-established in that region by suitable adjustment of the wall thickness of the connector, but this will not be necessary in most cases.

The frusto-conical portions 16 and 64 of the connector shown in FIGS. 1 and 2 are desirable but not essential. Each limits the insertion of the connector, simplifying the initial assembly operation. Further, the portion 64 gives extra room at the end of its connector for provision of the swaged down portion 68, while leaving adequate space within the connector to receive both the insert and the charge.

We have referred above to production of the reduced diameter portions of the connectors by swaging. Alternative techniques are spinning, die-sinking, for example push-pointing, and rolling. The connector may be formed around a preformed insert or may be formed separately from the insert. In the latter event, a device as shown in FIG. 2 could be produced by casting of the insert within the preformed connector.

In the illustrated arrangements the devices have been inserted so that their outer ends are substantially aligned with the front face of the tube plate. In many cases, it will be preferable to cause the outer ends of the connectors to project from the front face of the tube plate; the expansion of the connector will then cause "cut-off" of the unsupported ends of the connectors at the front face; this facilitates a weld right up to the front face of the plate avoiding a crevice at that face.

The repair technique is suitable for use on tubes originally secured by any of a wide range of different techniques; for example only—explosively welded, fusion welded, explosively expanded to form a mechanical joint, roller expanded.

I claim:

1. A method of repairing a pre-existing joint between a tube and a tubeplate of a heat exchanger, the tube extending through an aperture in the tubeplate and terminating adjacent to the surface of the tubeplate, comprising the steps of:
   (a) removing part of the length of said tube within the confines of the tubeplate thereby leaving exposed a part of the length of the tubeplate wall defining said aperture;
   (b) locating an open ended tubular metallic repair member within said tube with a part of the length of said member protruding from the tube toward the surface of the tubeplate;
   (c) explosively radially expanding said member so as to form circumferentially continuous welds between the external surface of said member and, respectively, the interior of the tube and said exposed part of the wall defining the aperture in the tubeplate.

2. A method as recited in claim 1 wherein step (b) is practiced by:
   locating a first portion of the tubular repair member within the tube and engaging the interior of the tube;
   locating a second portion of the tubular repair member within the tube and so externally shaped that there is a tapered annular space between it and the interior of the tube; and
   locating a third portion of the tubular repair member within the tubeplate aperture and so externally shaped that there is a tapered annular space between it and the said exposed part of the wall defining the aperture; and
   wherein step (c) is practiced so that explosive expansion causes at least part of the second and third portions of the tubular repair member to become circumferentially welded to the interior of the tube and tubeplate wall respectively.

3. A method as recited in claim 2 wherein step (b) is practiced so that the second portion of the tubular repair member is disposed intermediate the first and third portions thereof.

4. A method as recited in claim 2 or 3 wherein the third portion of the tubular repair member is cylindrical and extends to the adjacent end of the repair member, and wherein step (a) is practiced so that the exposed part of the wall defining the aperture tapers toward the tube.

5. A method as recited in claim 1 comprising the further step of, prior to step (b), counterboring the part of the length of the tube surrounding the repair member, so that after radial expansion of the repair member, the repair member substantially re-establishes the original tube bore.

6. A method as recited in claim 1 wherein steps (a) through (c) are practiced so that the weld between the external surface of the repair member and the interior of the tube is at least partially within the confines of the tubeplate.

* * * * *